United States Patent Office 3,847,853
Patented Nov. 12, 1974

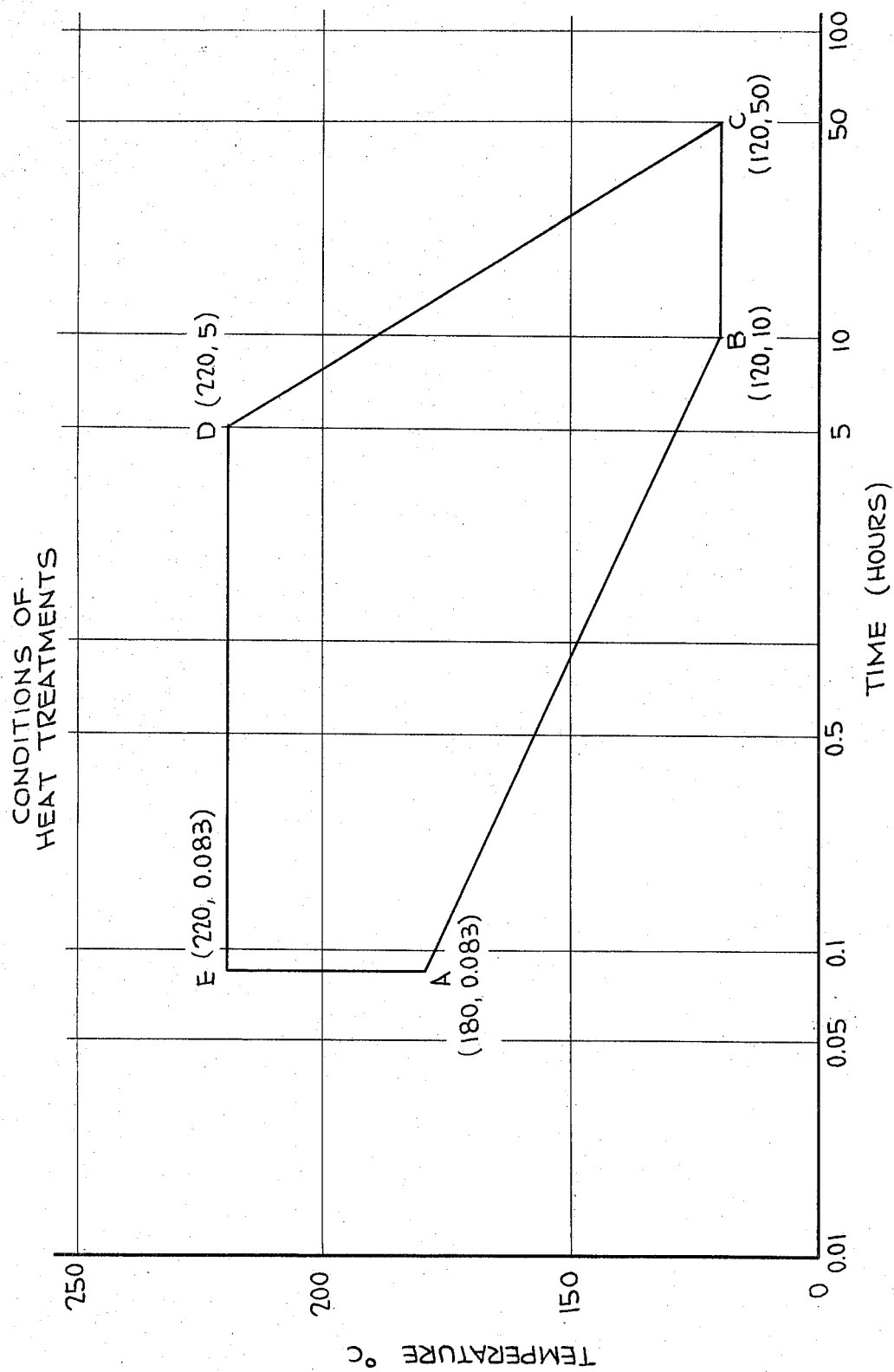

3,847,853
PROCESS FOR THE PREPARATION OF VINYL CHLORIDE RESINS HAVING GOOD THERMAL STABILITY
Tsunao Suzuki, Yokohama, Mitsushi Senuma, Chigasaki, Ichiro Takakura, Yokohama, and Toshio Masuda, Tokyo, Japan, assignors to Nippon Zeon Company, Ltd., Tokyo, Japan
Continuation-in-part of application Ser. No. 102,882, Dec. 30, 1970. This application Oct. 24, 1972, Ser. No. 300,111
Claims priority, application Japan, Dec. 30, 1969, 45/105,484
Int. Cl. C08f 3/30, 45/58
U.S. Cl. 260—23 XA                              5 Claims

ABSTRACT OF THE DISCLOSURE

A process for the preparation of vinyl chloride resins having excellent thermal stability which comprises heat treating 100 parts by weight of a vinyl chloride resin with 30–1000 parts by weight of at least one compound selected from the group consisting of water, a monohydric alcohol, a polyhydric aliphatic alcohol and mixtures thereof.

---

This invention relates to a process for preparing vinyl chloride resins having good thermal stability. More specifically, the invention relates to a process for preparing thermally stable vinyl chloride resins, by heat treating a vinyl chloride resin with at least one compound selected from the group consisting of water and monohydric or polyhydric alcohols.

The vinyl chloride resins, in view of their relatively well-balanced properties and low cost, are extensively used for a wide variety of purposes. However, since the processing temperature and decomposition temperature of the vinyl chloride resin are very close, special care must be exercised during processing, and it is difficult to carry out continuous molding operations for any prolonged period of time.

Since the mechanism of the thermal decomposition reaction of these vinyl chloride resins is exceedingly complex, the mechanism for their stabilization is still as yet not clear. Therefore, in blending the vinyl chloride resins in the past, various stabilizers have been empirically added. However, since stabilizers are expensive and may adversely affect the resin, the addition of large amounts of stabilizer which will enable the vinyl chloride resin to withstand the harsh processing conditions is not particularly desirable.

Further, it has been proposed to produce vinyl chloride resins having a regular structure using low temperature polymerization since it appears that the thermal decomposition of the vinyl chloride resin is due to the irregular structure of its molecules. However, the vinyl chloride resins having a regular structure, are more crystalline because of such structure, which causes the softening point to rise, i.e. its processing temperature rises, but there appears to be no significant effect on the resin's thermal stability.

It is within the above background and environment that the process for producing vinyl chloride resins with improved thermal stability was developed. Briefly, such process which obviates the above noted problems comprises heat treating a vinyl chloride resin with at least one compound selected from the group consisting of water, a monohydric alcohol having from 1 to 8 carbon atoms, and a polyhydric aliphatic alcohol having from 1 to 8 carbon atoms, under the temperature and time conditions shown in the accompanying drawing by a pentagonal region formed by connecting points, A, B, C, D and E, wherein point A represents a temperature of 180° C. and a time of 0.083 hours, point B represents a temperature of 120° C. and a time of 10 hours, point C represents a temperature of 120° C. and a time of 50 hours, point D represents a temperature of 220° C. and a time of 0.083 hours, and thereafter removing the water, alcohol, or mixture thereof, from the reaction system, the treating compound being present in an amount of 30–1000 parts by weight per 100 parts by weight of the vinyl chloride resin.

It is therefore, the primary object of the present invention to provide a process for improving the thermal stability of the vinyl chloride resins in a simple manner without bringing about a major change in the manufacturing process or the form of the vinyl chloride resins which are presently commercially available.

It is a further object of the present invention to produce a vinyl chloride resin having good thermal stability which can be utilized in a continuous molding operation over a prolonged period of time.

It is a still further object of the invention to provide a vinyl chloride resin having improved thermal stability so that it does not discolor during heat treating, i.e., a vinyl chloride resin which not only has superior thermal stability but also has a whiteness of substantially the same degree as that of a vinyl chloride resin before heat treatment.

It is a still further object of the present invention to provide a process for improving the thermal stability of vinyl chloride resins by heat treating the same with at least one of water, a monohydric aliphatic alcohol or polyhydric aliphatic alcohol.

Still further objects and advantages of the process of the present invention will become more apparent from the following more detailed description thereof.

The foregoing objects and advantages are achieved by way of the process of the present invention which comprises heat treating a vinyl chloride resin with at least one compound selected from the group consisting of water, a monohydric alcohol having from 1 to 8 carbon atoms, a polyhydric aliphatic alcohol having from 1 to 8 carbon atoms, and mixtures thereof under the temperature and time conditions shown in the accompanying drawing by a pentagonal region formed by connecting points A, B, C, D and E, wherein point A represents a temperature of 180° C. and a time of 0.083 hours, point B represents a temperature of 120° C. and a time of 10 hours, point C represents a temperature of 120° C. and a time of 50 hours, point D represents a temperature of 220° C. and a time of 5 hours, and point E represents a temperature of 220° C. and a time of 0.083 hours, and thereafter removing the water, alcohol or mixture thereof, from the reaction system, the compound being present in an amount of 30–1000 parts by weight per 100 parts by weight of the vinyl chloride resin.

Although the foregoing process produces a vinyl chloride resin with excellent heat stability, the resins often have a slightly brownish discoloration. It has been found however that such discoloration can be removed by way of the preferred process of the present invention which comprises heat treating a vinyl chloride resin with water and/or a lower monohydric or polyhydric aliphatic alcohol, in the presence of an epoxy compound and/or a metal salt of carboxylic acid, under the temperature and time conditions shown in the accompanying drawing by a pentagonal region formed by connecting points A, B, C, D and E.

The term "vinyl chloride resins," as used herein, refers to the vinyl chloride homopolymer obtained by the usual suspension, emulsion bulk or solution polymerization, and the copolymers of vinyl chloride with the ethylenically unsaturated monomers which are copolymerizable there-with and the graft-copolymers of vinyl chloride. Suitable ethylenically unsaturated monomers include the vinylidene halides such as vinylidene chloride and vinylidene bromide; the vinyl esters such as vinyl acetate, vinyl propionate, vinyl butyrate, vinyl chloroacetate, vinyl chloropropionate, vinyl benzoate and vinyl chlorobenzoate; the acrylic acids, alpha-alkyl acrylic acids and the alkyl esters thereof, such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate and ethyl methacrylate; amides such as acrylamide, N-methylacrylamide, N,N - dimethylacrylamide, methacrylamide, N - methylmethacrylamide and N,N - dimethylmethacrylamide; nitriles such as acrylonitrile, chloroacrylonitrile, methacrylonitrile and ethacrylonitrile; the aromatic vinyl compounds such as styrene, alpha - methylstyrene, monochlorostyrene, dichlorostyrene and vinyl naphthalene; maleic acid, fumaric acid and the alkyl esters thereof; the vinyl alkyl ethers and ketones such as vinylmethyl ether, vinylethyl ether, vinylisobutyl ether, methylvinyl ketone, ethylvinyl ketone and isobutylvinyl ketone; the monoolefinic compounds such as vinyl pyridine, N-vinylcarbazole, N-vinylpyrrolidone, ethylene ethyl malonate, isobutylene, ethylene and ethylene trichloride; and other various polymerizable compounds containing an olefinic bond.

By the term "the graft-copolymer of vinyl chloride" is meant graft copolymers obtained by polymerizing vinyl chloride or vinyl chloride and a monomer copolymerizable with vinyl chloride in the presence of olefin-vinyl ester copolymers, such as ethylene-vinyl acetate copolymers; olefin-alkyl methacrylate copolymers, such as ethylene-methyl methacrylate copolymers; polyolefin type polymers, such as polyethylene, ethylene-propylene copolymers, chlorinated polyolefin and chlorosulfonated polyethylene and so on; polyether type polymers, such as epichlorohydrin polymers, ethylene oxide-epichlorohydrin copolymers; diene type elastic polymers such as polybutadiene and polyisoprene; and so-called ABS, MBS and the like being represented by acrylonitrile-butadiene-styrene type resin and methyl methacrylate-butadiene-styrene type resin, or graft-copolymers obtained by polymerizing ethylenically unsaturated monomers, such as diene type monomers, unsaturated carboxylic acid and its ester derivatives, unsaturated nitrile, aromatic vinyl and derivatives thereof, in the presence of vinyl chloride homopolymers or copolymers, and the like. These graft polymers can be produced by any conventional method such as suspension polymerization, emulsion polymerization, bulk polymerization, solution polymerization, etc.

While the vinyl chloride resin used as the starting material may be in any readily available form such as a reaction mixture obtained subsequent to the completion of the polymerization reaction, a reaction product mixture obtained from a suitable recovery step and still in an undried state, or that obtained after a drying step and in the form of a powder, it is preferred that the vinyl chloride resin be in a form that does not hinder its complete contact with water/or a monohydric or polyhydrin aliphatic alcohol.

The aliphatic alcohol used in the present process has from 1 to 8 carbon atoms, and preferably 1-6 carbon atoms and may be either a primary, secondary or tertiary alcohol, and further may be either a monohydric or polyhydric alcohol such as methanol, ethanol, propanol, butanol, pentanol, hexanol, ethylene glycol, propylene glycol, and glycerine. In short, if the alcohol is normally liquid, it can be used without impeding the effects of the present invention. These alcohols may be used in the process of the present invention either singly or as a mixture of two or more thereof.

The epoxy compound used in the process of the present invention is a compound having at least one epoxy group attached to either the main chain or a side chain, such as saturated and unsaturated hydrocarbon compounds having an epoxy group; and the halogen, hydroxy and nitrile derivatives of these hydrocarbon compounds; the saturated and unsaturated alcohols having an epoxy group; the ether or ester compounds having an epoxy group derived from carboxylic acids and alcohols; and the halogen, hydroxy and nitrile derivatives of these ether or ester compounds such as ethylene oxide, propylene oxide, glycide, vinylcyclohexene oxide, glycidyl acrylate, glycidyl methacrylate and epoxidized soybean oil.

These epoxy compounds and mixtures thereof may be used in any amount but are preferably used in an amount of at least 1 part by weight, and most preferably from 3 parts by weight to not more than 50 parts by weight relative to 100 parts by weight of the vinyl chloride resin. When the amount of the epoxy compound used is less than 1 part by weight, the effect of checking the coloration of the treated vinyl chloride resin is decreased, and therefore undesirable. Further these epoxy compounds may be added all at once at the beginning, but the procedure of adding them incrementally or continuously during the heating treatment is recommended especially wherein the aqueous alcohol solution is used.

When the epoxy compounds are present during the heat treatment it is preferred that the proportion of water in the alcohol be no more than 80 volume percent. The total amount of water, aliphatic alcohol or mixture thereof used is preferably at least 30 parts by weight per 100 parts by weight of the vinyl chloride resin. When less than 30 parts by weight is used, full contact between the vinyl chloride resin and water and/or alcohols are not possible even with stirring and, as a result, the reaction does not proceed uniformly. Although the upper limit of the water, alcohol or mixture thereof is not particularly critical, it is preferred that no more than 1000 parts by weight per 100 parts by weight of vinyl chloride resin be used in view of the economical standpoint.

The metal salts of carboxylic acids to be used in the present invention are the metallic or organometallic salts of carboxylic acids having 1–20 carbon atoms. These carboxylic acids may be either aliphatic, aromatic or alicyclic acids, and may be saturated or unsaturated. Also these acids may be monobasic or polybasic and have various substituent groups. The metals include those belonging to groups I, II or IV of the periodic table of elements, such as Li, Na, K, Mg, Ca, Zn, Sr, Cd, Ba, Sn and Pb. The metal salts of carboxylic acids and mixtures thereof may be used in any amount but are preferably used in an amount of at least 0.2 part by weight, and most preferably at least 0.5 parts by weight, relative to 100 parts by weight of the vinyl chloride resin with not more than 20 parts by weight being preferred. Also mixtures of epoxy compounds and metal salts may be used.

Since there is a very close relationship between the heating temperature and heating time in the process of the present invention, it is hard to predict these conditions unconditionally. In general, however, it is required that the heating temperature should be not less than 120° C. It is impossible to specify the upper limit for the heating temperature, but it is advisable to avoid very high temperature conditions, usually 220° C. or less, since even with excellent agitation the resin particles melt, adhere to each other and become agglomerated. Usually at temperatures below 120° C. the objective of the instant invention cannot be achieved even if the treatment is performed over a prolonged period of time, so this is not preferred. The process takes 5 minutes or more as the lower limit for the treatment time, whereas no specific limitation is set on the upper limit, but 50 hours or less is desirable from an economic standpoint.

The treatment conditions of the instant invention can be come specifically explained by way of the accompanying drawing. The accompanying drawing is a semi-logarithmic graph which shows relationship between treatment temperatures and treating time. The process according to the instant invention brings about the most favorable results when it is performed under the treatment conditions shown by the pentagonal region formed by connecting point A representing a treatment temperature of 180° C. and a treatment time of 0.083 hr. that is 5 minutes, point B representing a treatment temperature of 120° C. and a treatment time of 10 hours, point C representing a treatment temperature of 120° C. and a treatment time of 50 hours, point D representing a treatment temperature of 220° C. and a treatment time of 5 hours, and point E representing a treatment temperature of 220° C. and a treatment time of 0.083 hour.

While it is preferred to carry out the heat treatment in an atmosphere of an inert gas or a system from which oxygen has been removed, it is not limited to conditions wherein oxygen is totally absent.

When the alcohol and/or water is removed from the treated mixture after completion of the heat treatment, a vinyl chloride resin containing an epoxy compound and/or a metal salt of the carboxylic acid is obtained. While it is desirable that these compounds are removed from the resin, their complete removal is not necessarily required, and the resin can be used for a variety of purposes with no harm while still containing these compounds. However, wherein the carboxylic acid metal salt, in particular, is added in excess, or wherein the carboxylic acid metal salt remaining in the treated vinyl chloride resin is considered to have an adverse effect on physical properties, it is preferred that these metal salts be removed by a suitable conventional method.

The process of the present invention will now be more fully illustrated by way of the following illustrative and comparative examples.

EXAMPLES 1-12

An agitator-equipped stainless steel autoclave is charged with 100 parts by weight of either distilled water, methanol or aqueous methanol and 20 parts by weight of a vinyl chloride resin of average degree of polymerization of 800 (Geon 103 EP-8 made by Japanese Geon Co., Ltd.), after which the autoclave is purged with nitrogen and thereafter the mixture is submitted to a treatment under the conditions indicated in Table 1. One hundred parts by weight of the resulting modified vinyl chloride resin are roll-milled for 7 minutes at 155° C. with 3 parts by weight of dibutyl tin maleate (T.V.S. #N2000 made by Nitto Chemiral Co., Ltd., Japan), 0.5 part by weight of calcium stearate and 0.2 part by weight of 2,2'-methylene-bis (4-methyl-6-tert.-butylphenol) and thereafter are pressed for 8 minutes at 160° C. Comparisons of the thermal stability of the resulting hard sheets are made by measuring the time that is required for the sheets to present a uniformly black appearance in a 190° C. air bath. The results obtained are shown in Table 1.

TABLE 1

| Example | Methanol content in the aqueous methanol (vol. percent) | Treatment Temperature (° C.) | Time (hr.) | Thermal stability (min.) |
|---|---|---|---|---|
| 1 | 0 | 150 | 5 | 120 |
| 2 | 20 | 150 | 5 | 160 |
| 3 | 80 | 150 | 5 | 240 |
| 4 | 100 | 150 | 5 | 140 |
| 5 | 80 | 200 | 0.15 | 140 |
| 6 | 80 | 180 | 0.5 | 140 |
| 7 | 80 | 170 | 2 | 160 |
| 8 | 80 | 170 | 5 | 240 |
| 9 | 80 | 130 | 20 | 160 |
| 10 | 80 | 130 | 40 | 160 |
| 11 | 80 | 80 | 40 | 100 |
| 12 | (Untreated resin) | | | 100 |

Example 11 is a control experiment in which the thermal stability is measured after the heat treatment is carried out for a prolonged period of time at a low temperature outside the present invention. On the other hand Example 12 is a control experiment in which the thermal stability measurement is made on a vinyl chloride resin which has been mixed and processed as in Examples 1-10 but without having received the treatment according to the present invention.

EXAMPLES 13-20

The experiments are carried out exactly as in Examples 1-12, except that the kinds of alcohol are varied. The thermal stabilities of the products thus obtained are likewise compared with the results shown in Table 2.

TABLE 2

| Ex. | Kind of alcohol | Alcohol content in the aqueous alcohol (mol percent) | Treatment Temperature (° C.) | Time (hr.) | Stability (min.) |
|---|---|---|---|---|---|
| 13 | Ethanol | 50 | 150 | 5 | 180 |
| 14 | Isopropyl alcohol | 50 | 150 | 5 | 180 |
| 15 | n-Pentyl alcohol | 50 | 150 | 5 | 180 |
| 16 | Neopentyl alcohol | 50 | 150 | 5 | 180 |
| 17 | Ethylene glycol | 50 | 150 | 5 | 160 |
| 18 | Glycerine | 50 | 150 | 5 | 160 |
| 19 | Ethanol | 50 | 80 | 20 | 100 |
| 20 | Isopropyl alcohol | 50 | 80 | 20 | 100 |

Examples 19 and 20 are control experiments in which the treatment is carried out for a prolonged period of time at a low temperature.

EXAMPLES 21-23

An agitator-equipped stainless steel autoclave is charged with 200 parts by weight of distilled water, 0.2 part by weight of partially saponified polyvinyl acetate and 0.2 part by weight of dilauroyl peroxide, followed by purging the autoclave with nitrogen and thereafter introducing 100 parts by weight of vinyl chloride under pressure and carrying out the polymerization reaction for 15 hours at 60° C. The polymeric conversion is 94% and the degree of polymerization of the polymer is 940. The unreacted monomer is discharged, after which 100 parts by weight of methanol are added and the heat treatment is carried out for 5 hours at 150° C. to obtain a modified polymer, which is measured for its thermal stability by operating as in Examples 1-12 (Example 21). As controls, the thermal stability of a polymer which is heat treated for 10 hours at 80° C. (Example 22) and that of an untreated polymer (Example 23) are also measured. The results obtained are shown in Table 3.

TABLE 3

| Example: | Thermal Stability (min.) |
|---|---|
| 21 | 140 |
| 22 | 100 |
| 23 | 100 |

EXAMPLES 24 AND 25

An agitator-equipped stainless steel autoclave is charged with 100 parts by weight of distilled water, 100 parts by weight of methanol and 0.5 part by weight of diisopropyl-peroxydicarbonate. The inside of the autoclave is then purged with nitrogen, after which 100 parts by weight of vinyl chloride are introduced under pressure, and the polymerization reaction is carried out for 20 hours at 50° C. The resulting polymer is then heat treated in situ for 3 hours by raising the temperature up to 150° C. This treated polymer is measured for its thermal stability by operating as in Examples 1-12 (Example 24) and, as control, the thermal stability of the polymer which is obtained by the omission of the 150° C. heat-treatment step (Example 25) is also measured. The results obtained are shown in Table 4.

TABLE 4

| Example: | Thermal Stability (min.) |
|---|---|
| 24 | 120 |
| 25 | 80 |

EXAMPLES 26–31

Various vinyl chloride copolymers and graft-copolymer as indicated in Table 5 are treated under varying conditions as shown in such table, using as the solvent a 50:50 by volume mixture of methanol and water. The results obtained are shown in Table 5. By way of comparison, data concerning control samples wherein the several copolymers are treated for 10 hours at 80° C. are also shown together in the same table.

EXAMPLES 41–43

An agitator-equipped stainless steel autoclave is charged with 500 parts by weight of an alcohol indicated in Table 7 and 100 parts by weight of a vinyl chloride resin of average polymerization degree of 800 (Geon 103 EP-8) and, after purging the autoclave with nitrogen, the mixture is heat treated for 5 hours at 150° C. after addition of 5 parts by weight of propylene oxide. The subsequent

TABLE 5

| Example | Kind of comonomer or trunk polymer | Amount of contained comonomer (wt. percent) | Specific viscosity of copolymer* | Treatment Temperature (° C.) | Treatment Time (hr.) | Thermal stability** (min.) | Thermal stability of control samples** (min.) |
|---|---|---|---|---|---|---|---|
| 26 | Vinyl acetate | 5.4 | 0.34 | 150 | 5 | 200 | 120 |
| 27 | Ethylene | 4.2 | 0.38 | 150 | 5 | 200 | 140 |
| 28 | Methyl acrylate | 5.2 | 0.34 | 130 | 5 | 180 | 120 |
| 29 | Octyl vinyl ether | 4.3 | 0.37 | 150 | 5 | 180 | 100 |
| 30 | EVA*** | 10.3 | | 170 | 3 | 190 | 100 |
| 31 | BR*** | 6.7 | | 170 | 3 | 190 | 80 |

*Goodrich specific viscosity; a specific viscosity measured in a 0.48 g./100 ml. nitrobenzene solution at 24° C.
**The test pieces are prepared by the same recipe as in Example 1, and are roll-milled for 7 minutes at 150° C. followed by pressing for 8 minutes at 155° C. The thermal stability is obtained by measuring the time required for blackening of the test pieces in an air bath of 170° C., except that in the case of the vinyl chloride-octyl vinyl ether copolymer, vinyl chloride-EVA and vinyl chloride-BR graft-copolymers samples, a temperature of 190° C. is used.
***EVA=EVATATE R 50511 (ethylene-vinyl acetate copolymer made by Sumitomo Chemical Co., Ltd., Japan); BR=NIPOL BR 1220 (high cis polybutadiene made by The Japanese Geon Co., Ltd., Japan).

EXAMPLES 32–40

An agitator-equipped stainless steel autoclave is charged with 500 parts by weight of ethanol and 100 parts by weight of a vinyl chloride resin of average polymerization degree of 800 (Geon 103 EP-8) and, after purging with nitrogen, 5 parts by weight of an epoxy compound indicated in Table 6 are added, and thereafter the heat treatment is carried out for 5 hours at 150° C. After removing the ethanol, the vinyl chloride resin is extracted for 24 hours with a Soxhlet extractor using methanol, followed by drying under reduced pressure.

Using this modified vinyl chloride resin, a blend of the same recipe as in Examples 1–12 is prepared, which is then roll-milled for 5 minutes at 155° C. and thereafter is pressed for 3 minutes at 160° C.

The extent of coloration and the thermal stability i.e., the time required for the sheet to present a uniform level of blackness in a 190° C. air bath of the resulting sheet are given in Table 6.

treatment and evaluation of the product are carried out as in Examples 1–12 with results being shown in Table 7.

TABLE 7

| Ex. | Alcohol | Color tone of pressed sheet | Thermal stability (min.) |
|---|---|---|---|
| 41 | Methanol | Slightly yellowish and transparent | 160 |
| 42 | sec. Butanol | Colorless and transparent | 108 |
| 43 | tert. Butanol | do | 120 |

EXAMPLES 44–50

An agitator-equipped stainless steel autoclave is charged with 500 parts by weight of ethanol and 100 parts by weight of a vinyl chloride resin of average polymerization degree of 800 (Geon 103 EP-8) followed by purging of the autoclave with nitrogen. The heat treatment is then carried out after adding epoxidized soybean oil in varying amounts and at a temperature ranging between 130° and 170° C. and a period of time ranging from 3 hours to 20 hours. The subsequent treatment and evaluation of the product are carried out as in Examples 32–40. The results obtained are shown in Table 8.

TABLE 6

| Ex. | Epoxy compound | Color tone of pressed sheet | Thermal stability (min.) |
|---|---|---|---|
| 32 | Ethylene oxide | Colorless and transparent | 180 |
| 33 | Propylene oxide | do | 180 |
| 34 | Glycide | do | 180 |
| 35 | Vinyl cyclohexeneoxide | do | 180 |
| 36 | Glycidyl acrylate | do | 180 |
| 37 | Glycidyl methacrylate | do | 180 |
| 38 | Epoxidized soybean oil | do | 180 |
| 39 | Addition of vinyl cyclohexanoxide during mixing. | do | 120 |
| 40 | Untreated | do | 100 |

Example 39 is a control experiment wherein a vinyl chloride resin which has not been treated in accordance with the present invention is used, to which 5 parts by weight of vinyl cyclohexenoxide are added during the milling to obtain a similar blend as in the present invention, which is then evaluated. On the other hand, Example 40 is a control experiment wherein a vinyl chloride resin not treated in accordance with the present invention is used and a blend of the same recipe as in Examples 1–12 is prepared by mixing in a same manner, and then is evaluated.

TABLE 8

| Ex. | Epoxidized soybean oil (parts by weight) | Heating temperature (° C.) | Treatment time (hr.) | Color tone of pressed sheet | Thermal stability (min.) |
|---|---|---|---|---|---|
| 44 | 1 | 150 | 5 | Slightly yellowish and transparent. | 180 |
| 45 | 5 | 130 | 20 | Colorless and transparent. | 140 |
| 46 | 5 | 150 | 10 | do | 240 |
| 47 | 5 | 150 | 20 | do | 260 |
| 48 | 5 | 170 | 3 | Slightly yellowish and transparent. | 180 |
| 49 | 5 | 170 | 5 | do | 240 |
| 50 | 50 | 150 | 5 | Colorless and transparent. | 180 |

EXAMPLES 51–53

An agitator-equipped stainless steel autoclave is charged with 500 parts by weight of ethanol, distilled water (varying amounts) and 100 parts by weight of a vinyl chloride resin (Geon 103 EP8) followed by purging the autoclave with nitrogen and adding 5 parts by weight of propylene oxide. The heat treatment of the mixture is then carried out for 5 hours at 150° C. During the heat treatment, 5 parts by weight of propylene oxide are introduced under pressure at each hourly interval. The subsequent treatment and operations are carried out as in Examples 32–40, with the results shown in Table 9.

TABLE 9

| Example | Distilled water (parts by weight) | Color tone of pressed sheet | Thermal stability (min.) |
|---|---|---|---|
| 51 | 100 | Colorless and transparent | 200 |
| 52 | 50 | do | 200 |
| 53 | 25 | do | 200 | parts by weight based on 100 parts by weight of resin and agitated for several minutes, and thereafter resin is filtered off, washed by water and dried at the aforesaid conditions.

An additive of the following standard recipe is blended with 100 parts by weight of the resulting modified vinyl chloride resin at room temperature, followed by milling the mixture for 5 minutes at 150° C. with heated rolls and thereafter pressing for 3 minutes at 155° C. to obtain the test piece.

The color tone of the so obtained test piece and its thermal stability, i.e., the time required for the test piece to blacken in a 180° C. air bath are shown in Table 11.

TABLE 11

| Example | Metal salts of carboxylic acid used during treatment | Recipe of additive | Color tone of pressed sheet | Thermal stability (min.) |
|---|---|---|---|---|
| 62 | Lithium stearate | Standard recipe | Colorless and transparent | 160 |
| 63 | Calcium acetate | do | do | 160 |
| 64 | Zinc stearate | do | do | 160 |
| 65 | Zinc benzoate | do | do | 160 |
| 66 | Lead stearate | do | do | 160 |
| 67 | Di-n-butyltin dilaurate | do | do | 160 |
| 68 | Unmodified resin | do | do | 80 |
| 69 | do | Standard recipe plus lithium stearate (3 parts) | Light reddish and transparent | 160 |
| 70 | do | Standard recipe plus calcium acetate (3 parts) | White and opaque | 120 |
| 71 | do | Standard recipe plus zinc stearate (3 parts) | do | 30 |
| 72 | do | Standard recipe plus zinc benzoate | do | 30 |
| 73 | do | Standard recipe plus di-n-butyltin dilaurate (3 parts) | Colorless and transparent | 120 |

EXAMPLES 54–61

An agitator-equipped stainless steel autoclave is charged with 500 parts by weight of ethanol, 100 parts by weight of distilled water and 100 parts of a vinyl chloride copolymer resin as indicated in Table 10. This is followed by purging of the autoclave with nitrogen, adding 5 parts by weight of propylene oxide, and thereafter heat treating the mixture for 5 hours at 150° C. During the heat treatment, 5 parts by weight of propylene oxide are introduced under pressure at each hourly interval. The subsequent treatment and operations are carried out as in Examples 26–29.

Examples 58–61 are control experiments in which the resin used did not receive the heat treatment according to the present invention.

The results obtained are shown in Table 10.

TABLE 10

| | Vinyl chloride copolymer resin | | | |
|---|---|---|---|---|
| Ex. | Composition | Vinyl chloride (wt. percent) | Specific viscosity* | Color tone of pressed sheet | Thermal stability (min.) |
| 54 | Vinyl chloride/vinyl acetate. | 94.6 | 0.34 | Colorless and transparent. | 160 |
| 55 | Vinyl chloride/ethylene. | 95.8 | 0.38 | do | 180 |
| 56 | Vinyl chloride/methyl acrylate. | 94.8 | 0.34 | do | 160 |
| 57 | Vinyl chloride/octyl vinyl ether. | 95.7 | 0.37 | do | 160 |
| 58 | Vinyl chloride/vinyl acetate. | 94.6 | 0.34 | do | 120 |
| 59 | Vinyl chloride/ethylene. | 95.8 | 0.38 | do | 140 |
| 60 | Vinyl chloride/methyl acrylate. | 94.8 | 0.34 | do | 120 |
| 61 | Vinyl chloride/octyl vinyl ether. | 95.7 | 0.77 | do | 100 |

*Goodrich specific viscosity.

EXAMPLES 62–73

An agitator-equipped stainless steel autoclave is charged with 450 parts by weight of ethanol, 50 parts by weight of distilled water, 100 parts by weight of a vinyl chloride resin (Geon 103 EP8) and 3 parts by weight of one of the various kinds of metal salts of carboxylic acids followed by closing the autoclave and purging the inside thereof with nitrogen. The mixture is then heated for 5 hours at 150° C. with stirring. The contents are then cooled, filtered and vacuum dried for 24 hours at 50° C. In Examples 64, 65 and 66, however, the contents are cooled to room temperature and combined with the 3.5% by weight of HCl aqueous solution in the amount of 3

As controls, also shown in Table 11 are the results of a test piece obtained from a blend of 100 parts by weight of an unmodified vinyl chloride resin and the following standard recipe additive (Example 68) and the results of test pieces obtained from blends of 100 parts by weight of an unmodified vinyl chloride resin, the following standard recipe additive and 3 parts by weight of a metal salt of a carboxylic acid (Examples 69–73).

STANDARD RECIPE ADDITIVE (PER 100 PARTS BY WEIGHT OF VINYL CHLORIDE RESIN)

Mark EP-5 (plasticizer and stabilizer composed of epoxy glycerides, made by Adeca Argus Chem.) __ 4.0
Mark 36 (stabilizer composed of Ca and Zn based complex, made by Adeca Argus Chem.) _____ 1.2
Mark QED (stabilizer composed of Zn based complex, made by Adeca Argus Chem.) _____ 0.3
Antigen MDP (antioxidant composed of 2,2'-methylene-bis(4-methyl-6-tert. - butylphenol), made by Sumitomo Chem.)
Stearyl alcohol (lubricant) _____ 1.0

EXAMPLES 74–76

An agitator-equipped stainless steel autoclave is charged with 450 parts by weight of an alcohol indicated in Table 12, 50 parts by weight of distilled water, 100 parts by weight of a vinyl chloride resin (Geon 103 EP8) and 3 parts by weight of zinc stearate. After purging the inside of the autoclave with nitrogen, the mixture is heat treated for 5 hours at 150° C. Subsequent to cooling the reaction mixture to room temperature 3 parts by weight of the 3.5% by weight of HCL aqueous solution on the basis of 100 parts by weight of resin are added and agitated for several minutes, and resin is filtered off, washed by water and thereafter dried under reduced pressure. The subsequent blending, milling and evaluation is then carried out as in Examples 62–73, with the results shown in Table 12.

TABLE 12

| Example | Alcohol used in the treatment | Color tone of pressed sheet | Thermal stability (min.) |
|---|---|---|---|
| 74 | Methanol | Colorless and transparent | 160 |
| 75 | sec.-Butanol | do | 160 |
| 76 | tert.-Butanol | do | 140 |

EXAMPLES 77–81

An agitator-equipped stainless steel autoclave is charged with 300 parts by weight of aqueous methanol of varying concentrations as indicated in Table 13, 100 parts by weight of a vinyl chloride resin (Geon 103 EP8) and additive and zinc lactate in varying amounts. The results obtained are shown in Table 14.

TABLE 14

| Ex. | Zinc lactate (parts by wt.) | Heating temperature (° C.) | Treatment time (hr.) | Color tone of pressed sheet | Thermal stability (min.) |
|---|---|---|---|---|---|
| 82 | 1 | 150 | 5 | Slightly yellowish and transparent | 140 |
| 83 | 5 | 130 | 20 | Colorless and transparent | 100 |
| 84 | 5 | 150 | 5 | ..... do ..... | 160 |
| 85 | 5 | 150 | 10 | ..... do ..... | 180 |
| 86 | 5 | 180 | 2 | ..... do ..... | 160 |
| 87 | 5 | 200 | 0.15 | ..... do ..... | 140 |
| 88 | 5 | 150 | 20 | ..... do ..... | >200 |
| 89 | 5 | 170 | 3 | ..... do ..... | 160 |
| 90 | 5 | 170 | 5 | ..... do ..... | 140 |
| 91 | 20 | 150 | 5 | ..... do ..... | 160 |
| 92 | Unmodified PVC plus standard recipe additive | | | Colorless and transparent | 80 |
| 93 | Unmodified PVC plus standard recipe additive plus Zn lactate (1 wt. percent) | | | ..... do ..... | 30 |
| 94 | Unmodified PVC plus standard recipe additive plus Zn lactate (5 wt. percent) | | | White and opaque | <30 |
| 95 | Unmodified PVC plus standard recipe additive plus Zn lactate (2 wt. percent) | | | ..... do ..... | <30 |

3 parts by weight of zinc octoate. After purging the autoclave with nitrogen, the mixture is heat treated for 5 hours at 150° C.

The preparation of the sample and evaluation are carried out as in Examples 64–66.

As control, evaluation is made of a test piece obtained from a blend consisting of 100 parts by weight of an unmodified vinyl chloride resin, the foregoing standard recipe additive and 3 parts by weight of zinc octoate (Example 81).

The results obtained are shown in Table 13.

TABLE 13

| Example | Concentration of methanol in the aqueous methanol (vol. percent) | Color tone of pressed sheet | Thermal stability (min.) |
|---|---|---|---|
| 77 | 100 | Colorless and transparent | 160 |
| 78 | 80 | ..... do ..... | 160 |
| 79 | 40 | ..... do ..... | 140 |
| 80 | 0 | ..... do ..... | 140 |
| 81 | | White and opaque | 30 |

EXAMPLES 82–95

An agitator-equipped stainless steel autoclave is charged with 450 parts by weight of methanol, 50 parts by weight of distilled water and 100 parts by weight of a vinyl chloride resin (Geon 103 EP8), after which the autoclave is purged with nitrogen. This is followed by the addition of zinc lactate in varying amounts and heat treatment of the mixture at a temperature ranging between 130° C. and 200° C. and a period of time ranging between 0.15 hours and 20 hours. In carrying out the subsequent treatment and evaluation of the product, the procedures described in Examples 74–76 are followed.

As controls, evaluations are also conducted on a test piece obtained from a blend consisting of 100 parts by weight of an unmodified vinyl chloride resin to which has been added the hereinbefore described standard recipe

EXAMPLES 96–110

An agitator-equipped stainless steel autoclave is charged with 900 parts by weight of methanol, 100 parts by weight of distilled water, 3 parts by weight of zinc lactate and 100 parts by weight of a vinyl chloride resin as indicated in the following table, after which the mixture is treated for 5 hours at 150° C. The subsequent treatment and evaluation of the product obtained are carried out as in Examples 74–76.

As controls, test pieces obtained from blends consisting of 100 parts by weight of an unmodified vinyl chloride resin to which has been added the aforesaid standard recipe additive and 3 parts by weight of zinc lactate (Examples 101, 103, 105, 107 and 109); and test pieces obtained from blends consisting of 100 parts of a modified vinyl chloride resin obtained by heat treating 100 parts of a vinyl chloride resin with 900 parts by weight of methanol and 100 parts by weight of distilled water, to which has been added the aforesaid standard recipe additive and 3 parts by weight of zinc lactate (Examples 102, 104, 106, 108 and 110) are evaluated.

The results obtained are shown in Table 15.

TABLE 15

| | Vinyl chloride copolymer resin | | | | |
|---|---|---|---|---|---|
| Ex. | Composition | Vinyl chloride content (wt. percent) | Specific viscosity* | Color tone of pressed sheet | Thermal stability (min.) |
| 96 | Vinyl chloride/vinyl acetate | 94.6 | 0.34 | Colorless and transparent | 100 |
| 97 | Vinyl chloride/ethylene | 95.8 | 0.38 | ..... do ..... | 100 |
| 98 | Vinyl chloride/methyl acrylate | 94.8 | 0.34 | ..... do ..... | 100 |
| 99 | Vinyl chloride/octyl vinyl ether | 95.7 | 0.37 | ..... do ..... | 180 |
| 100 | Vinyl chloride/EVA** | 89.7 | | Colorless and opaque | 180 |
| 101 | Vinyl chloride/vinyl acetate | 94.6 | 0.34 | White and opaque | 30 |
| 102 | do | 94.6 | 0.34 | Slightly brownish and opaque | 30 |
| 103 | Vinyl chloride/ethylene | 95.8 | 0.38 | White and opaque | 30 |
| 104 | do | 95.8 | 0.38 | Slightly brownish and opaque | 30 |
| 105 | Vinyl chloride/methyl acrylate | 94.8 | 0.34 | White and opaque | 30 |
| 106 | do | 94.8 | 0.34 | Slightly brownish and opaque | 30 |
| 107 | Vinyl chloride/octyl vinyl ether | 95.7 | 0.37 | White and opaque | 30 |
| 108 | do | 95.7 | 0.37 | Slightly brownish and opaque | 30 |
| 109 | Vinyl chloride/EVA** | 89.7 | | White and opaque | 30 |
| 110 | do | 89.7 | | Slightly brownish and opaque | 30 |

*Goodrich specific viscosity.
**See Table 5.

We claim:
1. A process for the preparation of vinyl chloride resins having excellent thermal stability, which comprises:
(A) heat treating a vinyl chloride resin with 30 to 1,000 parts by weight per 100 parts by weight of the vinyl chloride resin of at least one compound selected from the group consisting of water, methanol, ethanol, propanol, butanol, pentanol, hexanol, ethylene glycol, propylene glycol, and glycerine, under the temperature and time conditions shown in the accompanying drawing by a pentagonal region formed by connecting points A, B, C, D, and E, wherein
  (1) point A represents a temperature of 180° C. and a time of 0.083 hours,

(2) point B represents a temperature of 120° C. and a time of 10 hours,
(3) point C represents a temperature of 120° C. and a time of 50 hours,
(4) point D represents a temperature of 220° C. and a time of 5 hours,
(5) point E represents a temperature of 220° C. and a time of 0.083 hours, and (B) thereafter removing the compound or mixture of compounds from the reaction system.

2. A process for the preparation of vinyl chloride resins having excellent thermal stability which comprises:

(A) heat treating a vinyl chloride resin with 30 to 1,000 parts by weight per 100 parts by weight of the vinyl chloride resin of at least one compound selected from the group consisting of water, a monohydric aliphatic alcohol having from 1 to 8 carbon atoms, and a polyhydric aliphatic alcohol having from 1 to 8 carbon atoms, in the presence of at least one additional compound selected from the group consisting of (1) epoxy compounds having at least one epoxy group attached to the main or side chain, and
(2) carboxylic acid metal salts or organometallic salts
  (a) whose acid moiety is selected from the group consisting of aliphatic, aromatic and alicyclic carboxylic acids having from 1 to 20 carbon atoms and substituted derivatives thereof, and
  (b) whose metal moiety is selected from Groups I, II, IV of the Periodic Table, under the temperature and time conditions shown in the accompanying drawing by a pentagonal region formed by connecting points A, B, C, D, and E, wherein (1) point A represents a temperature of 180° C. and a time of 0.083 hours,
(2) point B represents a temperature of 120° C. and a time of 10 hours,
(3) point C represents a temperature of 120° C. and a time of 50 hours,
(4) point D represents a temperature of 220° C. and a time of 5 hours,
(5) point E represents a temperature of 220° C. and a time of 0.083 hours, and (B) thereafter removing the water, alcohol, or mixture thereof, and the additional compound from the reaction system.

3. The process of claim 2 wherein said compound is selected from methanol, ethanol, propanol, butanol, pentanol, hexanol, ethylene glycol, propylene, glycol, and glycerine.

4. The process of claim 2 wherein said additional compound is used in an amount of 0.2–50 parts by weight per 100 parts by weight of said vinyl chloride resin.

5. The process of claim 2 wherein said additional compound is selected from ethylene oxide, propylene oxide, glycide, vinylcyclohexene oxide, glycidyl acrylate, glycidyl methacrylate and epoxidized soybean oil.

References Cited

UNITED STATES PATENTS

| | | | |
|---|---|---|---|
| 3,644,276 | 2/1972 | Wood | 260—23 XA |
| 3,627,718 | 12/1971 | Seifert et al. | 260—92.8 A |
| 3,696,084 | 11/1972 | Gordon | 260—92.8 A |
| 3,125,546 | 3/1964 | Pinner et al. | 260—886 |
| 3,351,604 | 11/1967 | Saffold et al. | 260—884 |

MELVYN I. MARQUIS, Primary Examiner

R. W. GRIFFIN, Assistant Examiner

U.S. Cl. X.R.

260—87.5 R, 92.8 A

UNITED STATES PATENT OFFICE
CERTIFICATE OF CORRECTION

Patent No. 3,847,853　　　　　　　Dated November 12, 1974

Inventor(s) Tsunao SUZUKI ET AL

It is certified that error appears in the above-identified patent and that said Letters Patent are hereby corrected as shown below:

In the Heading, correct the number of the Japanese Application from which priority is claimed in this application to read as follows:

-- 44/105,484 --

Signed and sealed this 14th day of January 1975.

(SEAL)
Attest:

McCOY M. GIBSON JR.　　　　　　C. MARSHALL DANN
Attesting Officer　　　　　　　Commissioner of Patents